(12) United States Patent
Yin et al.

(10) Patent No.: US 12,060,091 B2
(45) Date of Patent: Aug. 13, 2024

(54) DEEP LEARNING-BASED STOP CONTROL METHOD AND SYSTEM FOR HIGH-SPEED TRAIN

(71) Applicant: BEIJING JIAOTONG UNIVERSITY, Beijing (CN)

(72) Inventors: Jiateng Yin, Beijing (CN); Chenhe Ning, Beijing (CN); Shuai Su, Beijing (CN); Kaicheng Li, Beijing (CN); Tao Tang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 321 days.

(21) Appl. No.: 17/477,964

(22) Filed: Sep. 17, 2021

(65) Prior Publication Data
US 2022/0126894 A1 Apr. 28, 2022

(30) Foreign Application Priority Data
Oct. 28, 2020 (CN) .......................... 202011172086.8

(51) Int. Cl.
*G06N 20/10* (2019.01)
*B61H 11/02* (2006.01)
(Continued)

(52) U.S. Cl.
CPC .......... *B61H 11/02* (2013.01); *G06F 18/214* (2023.01); *G06N 3/08* (2013.01)

(58) Field of Classification Search
CPC .......... B61H 11/02; G06F 18/214; G06N 3/08
See application file for complete search history.

(56) References Cited

U.S. PATENT DOCUMENTS

| 9,387,866 | B1 | 7/2016 | Di Cairano et al. |
| 11,468,318 | B2 * | 10/2022 | Liu ...................... H04N 7/0127 |

(Continued)

FOREIGN PATENT DOCUMENTS

| CN | 107399333 A | 11/2017 |
| CN | 109204390 A | 1/2019 |

(Continued)

OTHER PUBLICATIONS

Office Action, corresponding in Chinese patent application No. 202011172086.8, dated Feb. 23, 2021.

*Primary Examiner* — Gonzalo Laguarda
(74) *Attorney, Agent, or Firm* — MARSHALL, GERSTEIN & BORUN LLP (57) ABSTRACT

The present disclosure provides a deep learning-based stop control method and system for a high-speed train, and relates to the technical field of rail transit management and control. The method includes: obtaining a training data set; establishing a convolutional neural network (CNN); training and optimizing the CNN by using the training data set, to obtain an optimized CNN; obtaining actual running data of a to-be-controlled train; inputting the actual running data into the optimized CNN to obtain a stop position of the to-be-controlled train; determining whether the stop position of the to-be-controlled train is 0; and if the stop position of the to-be-controlled train is 0, outputting a breaking command; or if the stop position of the to-be-controlled train is not 0, performing the step of "obtaining actual running data of a to-be-controlled train". The present disclosure can ensure accurate stop of a high-speed train without high costs.

4 Claims, 8 Drawing Sheets

(51) Int. Cl.
*G06F 18/214* (2023.01)
*G06N 3/08* (2023.01)

(56) References Cited

U.S. PATENT DOCUMENTS

| | | | | |
|---|---|---|---|---|
| 11,493,927 | B2 * | 11/2022 | Green | G06N 3/044 |
| 11,531,844 | B2 * | 12/2022 | Bharti | G01N 15/1429 |
| 2016/0280242 | A1 | 9/2016 | Di Cairano et al. | |
| 2022/0277551 | A1 * | 9/2022 | Li | G06V 20/582 |

FOREIGN PATENT DOCUMENTS

| | | |
|---|---|---|
| CN | 109895794 A | 6/2019 |
| CN | 110262463 A | 9/2019 |
| CN | 111114593 A | 5/2020 |

* cited by examiner

DEEP LEARNING-BASED STOP CONTROL METHOD AND SYSTEM FOR HIGH-SPEED TRAIN

CROSS REFERENCE TO RELATED APPLICATION

This patent application claims the benefit and priority of Chinese Patent Application No. 202011172086.8, filed on Oct. 28, 2020, the disclosure of which is incorporated by reference herein in its entirety as part of the present application.

TECHNICAL FIELD

The present disclosure relates to the technical field of rail transit management and control, and in particular, to a deep learning-based stop control method and system for a high-speed train.

BACKGROUND ART

Rail transportation has been fully developed in China owing to its advantages of energy saving, comfortableness, environmental protection, safety, punctuality, and convenience. High-speed railways not only can greatly reduce travel costs of passengers and alleviate burden of the passengers, but also can drive the economy along the railways and narrow regional differences. By the end of 2019, the total mileage of China's operational high-speed railways has reached 35,000 km, accounting for more than ⅔ of the world's total mileage. In 2019, the passenger volume of operational multiple-unit trains of China's high-speed railways ranked first in the world, with an annual total of 2.29 billion passengers. As one of seven major fields of new infrastructure, G-series high-speed trains will still be vigorously developed in the future.

In a railway system device, as a key technology of railway transportation, automatic train operation (ATO) effectively improves the transportation efficiency and automation process, and becomes an important symbol of high-speed train intelligence. Stop accuracy is an important indicator to measure performance of an ATO system. Accurate stop can enable a train to run on time, improve comfortableness of passengers, and reduce workload of a driver. In stop control of the train, both stop accuracy and comfortableness need to be considered, and it is forbidden to switch a traction/breaking command frequently. At present, a high-speed train usually approaches a stop point through multi-stage speed regulation, and finally selects an appropriate position and speed to output the breaking command, to make the train stop near the stop point. However, because the high-speed train is a very complex nonlinear time-delay system, some parameters will be affected by an external environment (such as weather changes, rain, and snow), device wear, or other factors. As a result, the existing stop model cannot accurately estimate a stop error and deliver a wrong breaking command. At present, the traditional proportional integral derivative (PID) control model is mostly used to control the train to stop. In a complex and changeable train control system, because parameters of a controller are fixed, a parameter change of the train stop control model cannot be accurately reflected.

When the train stops in a station, an error between a stop position of the train and a stop sign should not exceed ±30 cm. The stop error is related to breaking force, air resistance, friction force, a rail grade, a time delay of the train, and other factors. Coupling force between compartments of the train is not considered, and the train is regarded as a particle. It is assumed that a position of the stop sign is 0. A position beyond the stop sign is a negative value, and a position not beyond the stop sign is a positive value. A motion process when the train stops is described as follows:

$$\frac{dv}{dt} = -f_b b(v, \tau) - f_r(v) - f_g(s)$$

$$\frac{ds}{dt} = v$$

In the above formulas, v represents a speed of the train, in units of m/s; t represents a running time of the train, in units of s; $f_b$ represents breaking constants of different breaking levels; $b(v,\tau)$ represents a function mapping relationship between the breaking force and each of the speed v and a delay $\tau$, in units of N; $f_r(v)$ represents running resistance caused by the air resistance and the friction force, in units of N; $f_g(s)$ represents running resistance caused by the rail grade and a rail curvature, in units of N; and s represents a distance between the train and the stop sign, in units of m.

It is assumed that a running speed of the train is $v_0$ and a distance between the train and the stop sign is $s_0$ before the last breaking, a start breaking time point of the train is $t_0$, and an end breaking time point of the train is $t_e$. Because a speed of the train at rest is 0, the following formula is met:

$$v_0 - \int_{t_0}^{t_e}(-f_b b(v,\tau) - f_r(v) - f_g(s))dt = 0$$

In this case, the stop error $\rho$ is:

$$\rho = s_0 - \int_{t_0}^{t_e} v \, dt$$

The above model is an accurate mathematical model considering all factors. Because the model contains many nonlinear characteristics (such as the air resistance) and the time delay of the train, a very complex motion model needs to be established. This is difficult to achieve in practical application because some parameters are easy to change due to interference from the external environment. In addition, different vehicles adapt to the environment differently, and are sensitive to the parameters differently. In practical application, the model needs to undergo massive field tests, increasing research and development costs.

To sum up, the train breaking system is a very complex nonlinear time-delay system, including massive parameters. The existing train breaking model has fixed parameters. Affected by the external environment (such as wind, frost, rain, snow, and temperature) and a running loss of the train, the train breaking model is not accurate, and cannot accurately estimate the stop error. In addition, massive field tests are needed to debug the parameters of the existing train breaking model, resulting in high costs. Therefore, the existing model cannot dynamically perceive impact of an external environment change on the train or reflect a real running status of the train, and thus cannot accurately predict the stop position of the train. To accurately predict the stop position of the train by using the existing model, to enable the high-speed train to stop accurately, massive field tests and parameter adjustments are required, resulting in huge research and development costs.

SUMMARY

An objective of the present disclosure is to provide a deep learning-based stop control method and system for a high-speed train, to ensure accurate stop of a high-speed train without high costs.

To implement the foregoing objective, the present disclosure provides the following solution:

A deep learning-based stop control method for a high-speed train includes:

obtaining a training data set, where the training data set includes a corresponding position, speed, and stop position of a train at each time point in a specified time period, and the specified time period includes a current time point and a time point before the current time point;

establishing a convolutional neural network (CNN);

training and optimizing the CNN by using the training data set, to obtain an optimized CNN;

obtaining actual running data of a to-be-controlled train, where the actual running data includes a corresponding position and speed of the to-be-controlled train at each time point in the specified time period;

inputting the actual running data into the optimized CNN to obtain a stop position of the to-be-controlled train;

determining whether the stop position of the to-be-controlled train is 0; and if the stop position of the to-be-controlled train is 0, outputting a breaking command; or if the stop position of the to-be-controlled train is not 0, performing the step of "obtaining actual running data of a to-be-controlled train".

Optionally, after the obtaining a training data set, the method further includes:

standardizing the position and the speed of the train.

Optionally, the CNN specifically includes an input layer, A convolutional layers, an expansion layer, B hidden layers, and an output layer, where A is a positive integer greater than 0 and less than or equal to 2, and B is a positive integer greater than or equal to 2 and less than or equal to 3;

the input layer includes (N−1)*2 two-dimensional input neurons, where N represents a quantity of time points included in the specified time period;

each convolutional layer includes C convolution kernels, where C is a positive integer greater than or equal to 10 and less than or equal to 30; and each hidden layer includes D neurons, where D is a positive integer greater than or equal to 5 and less than or equal to 20.

Optionally, the training and optimizing the CNN by using the training data set, to obtain an optimized CNN specifically includes:

training and optimizing the CNN based on the training data set and by using an Adamax optimization algorithm and a Dropout method, to obtain the optimized CNN.

The present disclosure further provides the following technical solution:

A deep learning-based stop control system for a high-speed train includes:

a training data set obtaining module, configured to obtain a training data set, where the training data set includes a corresponding position, speed, and stop position of a train at each time point in a specified time period, and the specified time period includes a current time point and a time point before the current time point;

a CNN establishment module, configured to establish a CNN;

a training and optimization module, configured to train and optimize the CNN by using the training data set, to obtain an optimized CNN;

an actual running data obtaining module, configured to obtain actual running data of a to-be-controlled train, where the actual running data includes a corresponding position and speed of the to-be-controlled train at each time point in the specified time period;

a prediction module, configured to input the actual running data into the optimized CNN to obtain a stop position of the to-be-controlled train;

a determining module, configured to determine whether the stop position of the to-be-controlled train is 0;

a breaking module, configured to output a breaking command when an output result of the determining module is that the stop position of the to-be-controlled train is 0; and a return module, configured to return to execute the actual running data obtaining module when the output result of the determining module is that the stop position of the to-be-controlled train is not 0.

Optionally, the system further includes:

a standardization module, configured to standardize the position and the speed of the train.

Optionally, the CNN specifically includes an input layer, A convolutional layers, an expansion layer, B hidden layers, and an output layer, where A is a positive integer greater than 0 and less than or equal to 2, and B is a positive integer greater than or equal to 2 and less than or equal to 3;

the input layer includes (N−1)*2 two-dimensional input neurons, where N represents a quantity of time points included in the specified time period;

each convolutional layer includes C convolution kernels, where C is a positive integer greater than or equal to 10 and less than or equal to 30; and each hidden layer includes D neurons, where D is a positive integer greater than or equal to 5 and less than or equal to 20.

Optionally, the training and optimization module specifically includes:

a training and optimization unit, configured to train and optimize the CNN based on the training data set and by using an Adamax optimization algorithm and a Dropout method, to obtain the optimized CNN.

Based on specific embodiments provided in the present disclosure, the present disclosure has the following technical effects:

According to the deep learning-based stop control method and system for a high-speed train disclosed in the present disclosure, a CNN is used for the first time to predict a stop position of a train, effectively improving stop accuracy of the train. A data driving method is used to map a train breaking model directly by using real-time data generated in a running process of the train, so that actual running status information of the train can be reflected, thereby achieving accurate prediction, and mapping the actual running status information of the train based on an external environment while improving the stop accuracy of the train. During model establishment, only data needs to be used for fitting, greatly reducing costs.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the following accompanying drawings show merely some embodiments of the present disclosure. A person of ordinary skill in the art may still derive other drawings from these accompanying drawings without creative efforts.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a deep learning-based stop control method and system for a high-speed train, to ensure accurate stop of a high-speed train without high costs.

To make the above objective, features, and advantages of the present disclosure clearer and more comprehensible, the present disclosure is described in further detail below with reference to the accompanying drawings and specific implementations.

Based on real-time train running data collected by an ATO system, the present disclosure designs a deep learning-based on-line estimation method for a control model for accurate stop of a high-speed train. A stop position of a train is predicted in real time based on a current running status of the train and running status information of the train in the past period of time, and a breaking command is output when a predicted stop position is 0, thereby reducing an error between the stop position and a stop sign.

Figure 1:
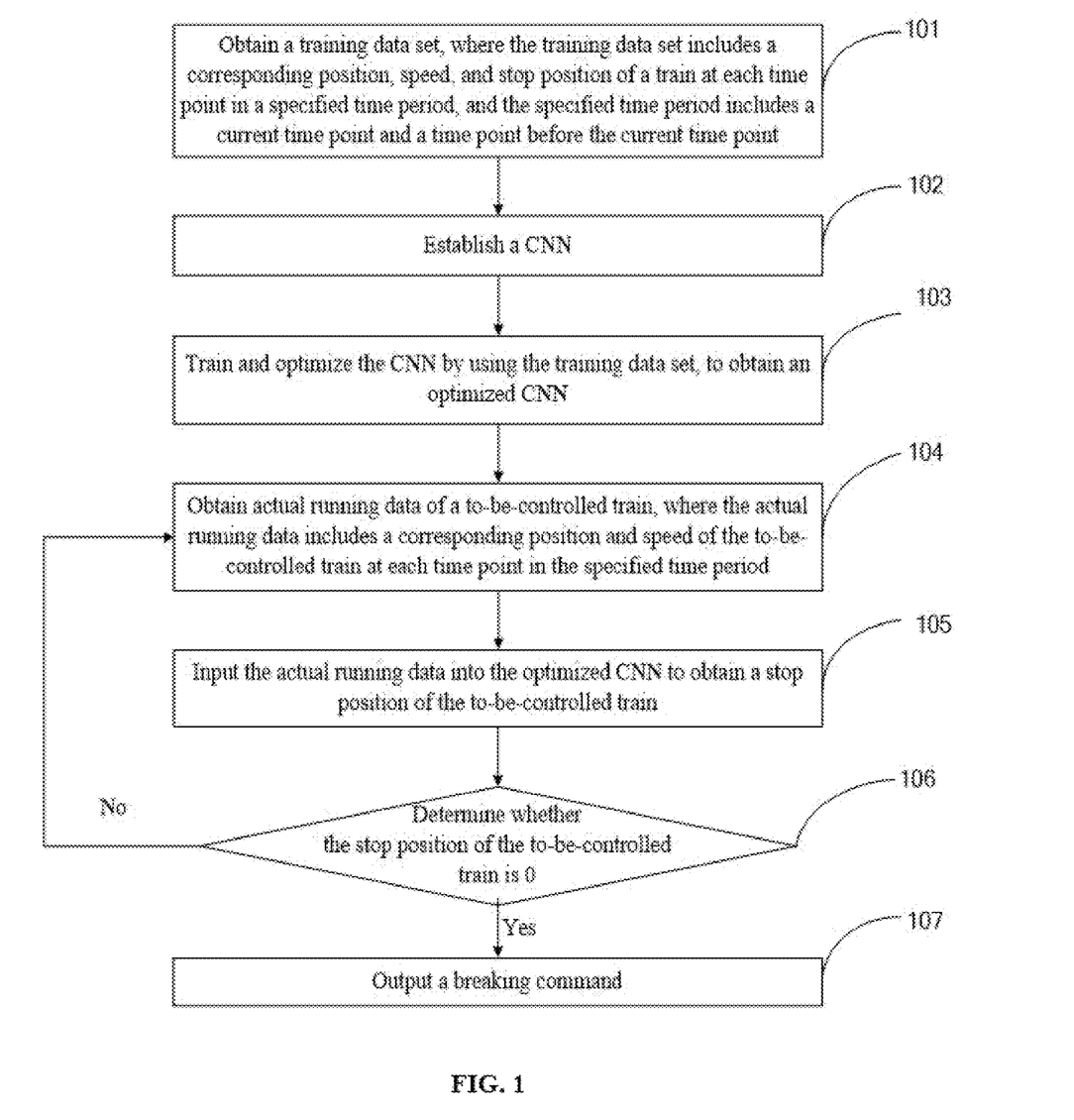
FIG. 1 is a flowchart of a deep learning-based stop control method for a high-speed train according to the present disclosure.
Figure 2:
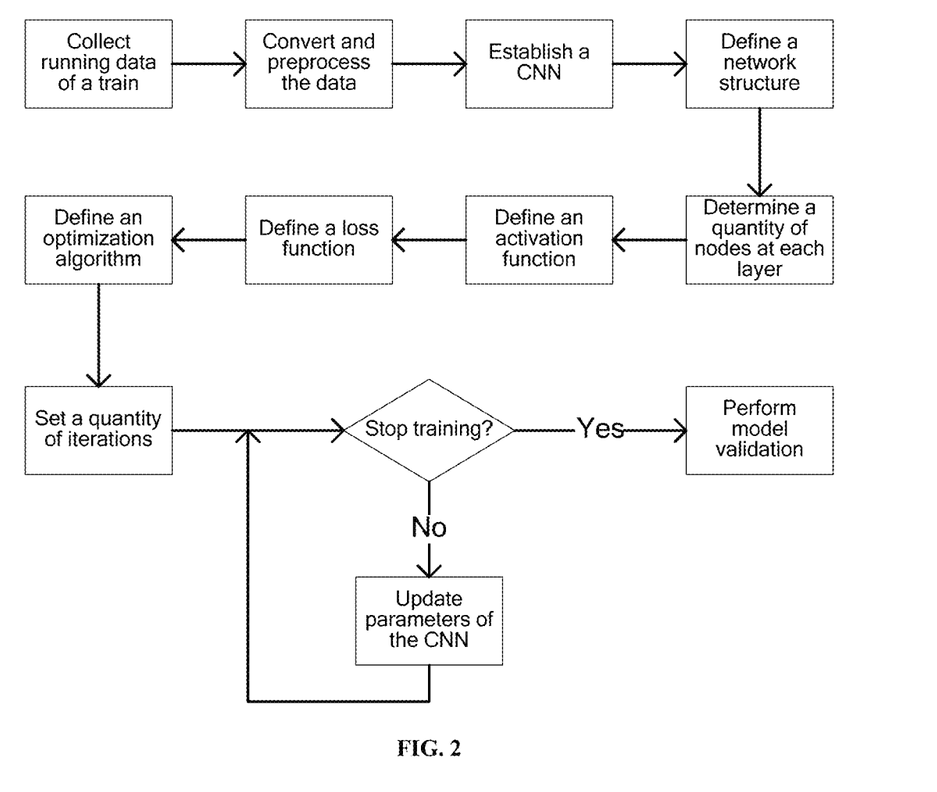
FIG. 2 is an overall implementation flowchart of a CNN-based control model for accurate stop of a high-speed train according to the present disclosure.

FIG. 1 is a flowchart of an embodiment of a deep learning-based stop control method for a high-speed train according to the present disclosure. FIG. 2 is an overall implementation flowchart of a CNN-based control model for accurate stop of a high-speed train according to the present disclosure. As shown in FIG. 1 and FIG. 2, the method mainly includes the following steps: (1) collecting data; (2) establishing a CNN; (3) defining an activation function; (4) defining a loss function; (5) defining a network optimization algorithm; (6) performing network training; and (7) validating and comparing numerical values of models. The deep learning-based stop control method for a high-speed train specifically includes the following steps.

Step 101: Obtain a training data set, where the training data set includes a corresponding position, speed, and stop position of a train at each time point in a specified time period, and the specified time period includes a current time point and a time point before the current time point.

Figure 3:
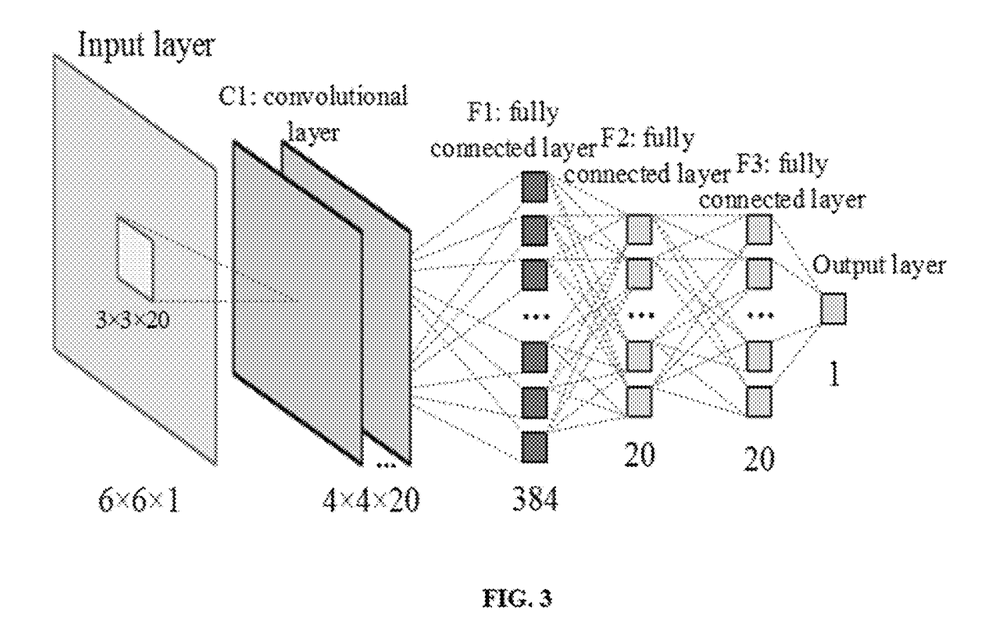
FIG. 3 shows a change of a speed with time in a stop process of a train.
Figure 4:
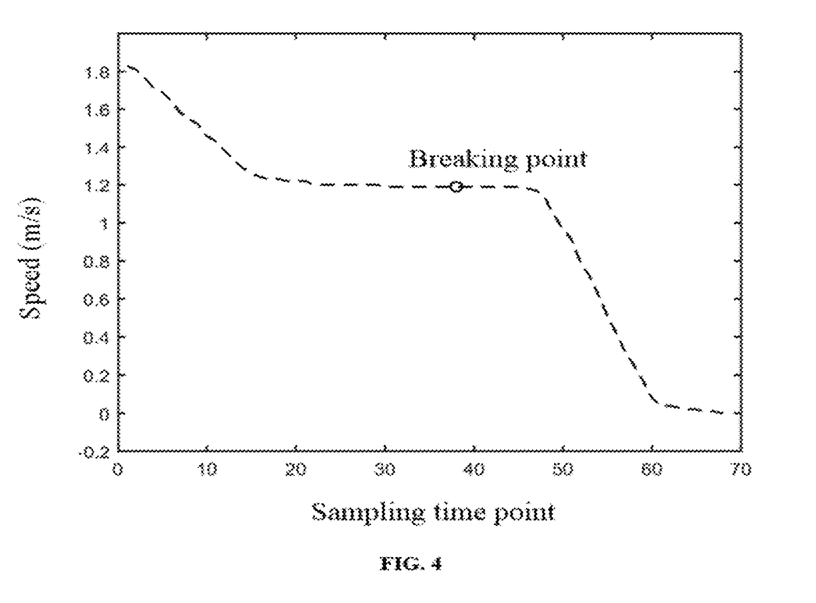
FIG. 4 shows a change of a position with time in a stop process of a train.

In step 101, running data of the train is collected. In a running process of the train, an on-board ATO system records the running data of the train in real time at a fixed time interval such as 0.2 s, including a position, a target position, a speed, a target speed, an acceleration, a control command, a rail grade, and other information of the train, as shown in Table 1. For the information, a data set data=$\{s_t, v_t\}$ with time as an axis is established, as shown in FIG. 3 and FIG. 4. FIG. 3 shows a change of the speed with time in a stop process of the train, and FIG. 4 shows a change of the position with time in the stop process of the train. In the above data set, t represents a sampling time point, s represents a position of the train at the time point t, and v represents a speed of the train at the time point t. At a model training stage of the present disclosure, position and speed information of the train in a period of time before a breaking point in a stop process is selected as an input of the network, and stop position information of the train is selected as an output of the model. The position information, the speed information, and the stop position information are expressed as the following mathematical symbols:

$s_{t-N}, s_{t-N+1}, \ldots, s_t$ respectively represent running positions of the train at t-N, t-N+1, ..., 0 before breaking.

$v_{t-N}, v_{t-N+1}, \ldots, v_0$ respectively represent running speeds of the train at t-N, t-N+1, ..., 0 before breaking.

$s_e$ represents an actual stop position of the train.

TABLE 1

A part of the training data set

| SN | Speed | Target speed | Acceleration | Distance away from the stop sign | Target distance | Traction/breaking |
|---|---|---|---|---|---|---|
| 3020 | 0.789 | 0 | 0.005 | −5.42 | 38.8 | Break |
| 3021 | 0.789 | 0 | 0.0025 | −5.26 | 38.8 | Break |
| 3022 | 0.789 | 0 | 0.0012 | −5.01 | 38.8 | Break |
| 3023 | 0.789 | 0 | 0.0006 | −4.87 | 38.8 | Break |
| 3024 | 0.789 | 0 | 0.0003 | −4.61 | 38.8 | Break |
| 3025 | 0.789 | 0 | 0.0001 | −4.45 | 38.8 | Break |
| 3026 | 0.789 | 0 | 0 | −4.22 | 38.8 | Break |
| 3027 | 0.789 | 0 | 0 | −4.06 | 38.8 | Break |
| 3028 | 0.789 | 0 | 0 | −3.83 | 38.8 | Break |
| 3029 | 0.78 | 0 | 0.02 | −3.67 | 38.8 | Break |
| 3030 | 0.78 | 0 | 0.01 | −3.51 | 38.8 | Break |
| 3031 | 0.78 | 0 | 0.005 | −3.27 | 38.8 | Break |
| 3032 | 0.78 | 0 | 0.0025 | −3.03 | 38.8 | Break |
| 3033 | 0.78 | 0 | 0.0012 | −2.86 | 38.8 | Break |
| 3034 | 0.77 | 0 | 0.0206 | −2.62 | 38.8 | Break |
| 3035 | 0.76 | 0 | 0.0303 | −2.47 | 38.8 | Break |
| 3036 | 0.74 | 0 | 0.0551 | −2.25 | 38.8 | Break |
| 3037 | 0.719 | 0 | 0.0675 | −2.09 | 38.8 | Break |
| 3038 | 0.669 | 0 | 0.1337 | −1.89 | 38.8 | Break |
| 3039 | 0.64 | 0 | 0.1268 | −1.76 | 38.8 | Break |
| 3040 | 0.57 | 0 | 0.2034 | −1.6 | 38.8 | Break |
| 3041 | 0.53 | 0 | 0.1817 | −1.48 | 38.8 | Break |
| 3042 | 0.459 | 0 | 0.2308 | −1.34 | 38.8 | Break |
| 3043 | 0.41 | 0 | 0.2154 | −1.25 | 38.8 | Break |
| 3044 | 0.34 | 0 | 0.2477 | −1.13 | 38.8 | Break |
| 3045 | 0.299 | 0 | 0.2038 | −1.08 | 38.8 | Break |
| 3046 | 0.229 | 0 | 0.2419 | −1.01 | 38.8 | Break |
| 3047 | 0.179 | 0 | 0.2209 | −0.98 | 38.8 | Break |
| 3048 | 0.11 | 0 | 0.2504 | −0.94 | 38.8 | Break |
| 3049 | 0.06 | 0 | 0.2252 | −0.93 | 38.8 | Break |
| 3050 | 0.02 | 0 | 0.1926 | −0.93 | 38.8 | Break |
| 3051 | 0.02 | 0 | 0.0963 | −0.93 | 38.8 | Break |
| 3052 | 0.02 | 0 | 0.0481 | −0.93 | 38.8 | Break |

TABLE 1-continued

A part of the training data set

| SN | Speed | Target speed | Acceleration | Distance away from the stop sign | Target distance | Traction/breaking |
|---|---|---|---|---|---|---|
| 3053 | 0.02 | 0 | 0.024 | −0.93 | 38.8 | Break |
| 3054 | 0.01 | 0 | 0.032 | −0.93 | 38.8 | Break |
| 3055 | 0.01 | 0 | 0.016 | −0.93 | 38.8 | Break |
| 3056 | 0.01 | 0 | 0.008 | −0.93 | 38.8 | Break |
| 3057 | 0 | 0 | 0.024 | −0.93 | 38.8 | Break |
| 3058 | 0 | 0 | 0.012 | −0.93 | 38.8 | Break |
| 3059 | 0 | 0 | 0.006 | −0.93 | 38.8 | Break |

After step 101, the method further includes the following step:

Standardize the position and the speed of the train, specifically, preprocess the data. An object processed by the CNN is usually an image or a natural language, which is input in a two-dimensional form. Therefore, the collected data set needs to be converted, and then processed by the CNN. In the collected data, the running speed is in units of m/s, and the running position is in units of m. The running speed and the running positions have different dimensions, and their value ranges are also different in the model, resulting in a low weight training effect. In this case, the input data needs to be standardized and converted into dimensionless pure numerical values. Common standardization methods include Min-Max standardization and Z-score standardization. Z-score standardization is used in the present disclosure.

Step 102: Establish the CNN.

Figure 5:
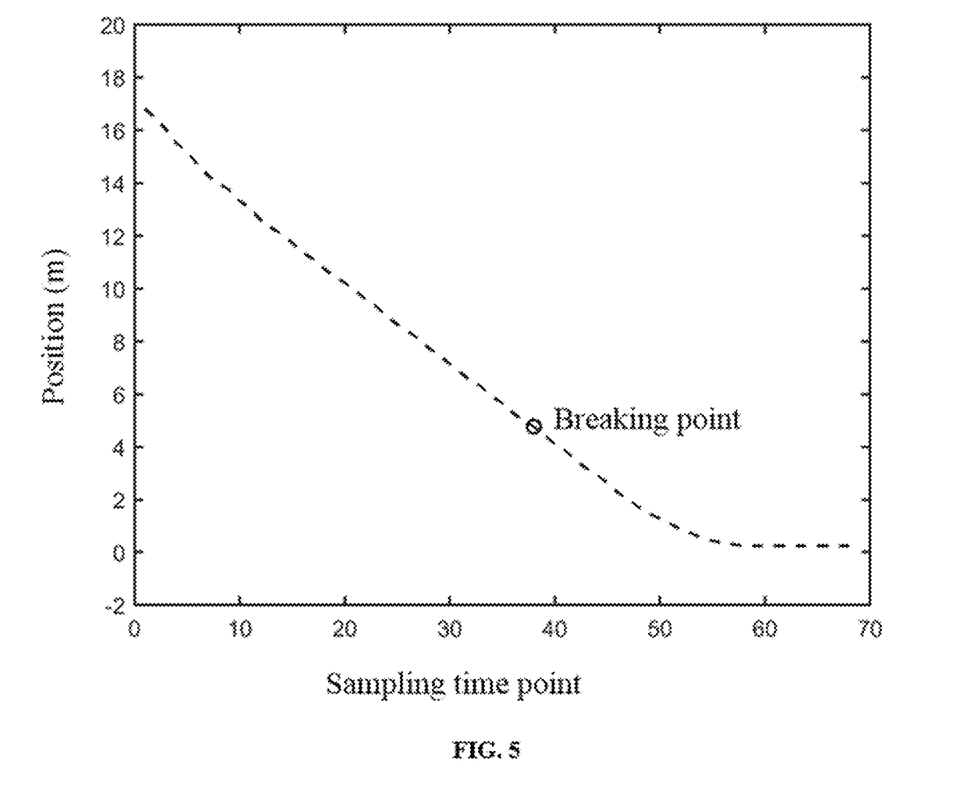
FIG. 5 is a structural diagram of a CNN.

FIG. 5 is a structural diagram of the CNN. As shown in FIG. 5, the CNN specifically includes an input layer, A convolutional layers, an expansion layer, B hidden layers, and an output layer, where A is a positive integer greater than 0 and less than or equal to 2, and B is a positive integer greater than or equal to 2 and less than or equal to 3.

The input layer includes (N−1)*2 two-dimensional input neurons, where N represents a quantity of time points included in the specified time period.

Each convolutional layer includes C convolution kernels, where C is a positive integer greater than or equal to 10 and less than or equal to 30.

Each hidden layer includes D neurons, where D is a positive integer greater than or equal to 5 and less than or equal to 20.

Step 102 specifically includes the following steps:

Establish the input layer of the CNN. There is a very serious time delay in the stop process of the train. As a result, prediction of the stop position by the model is not only related to running status information at a current sampling time point t, but also related to running status information at previous sampling time points t−1, t−2, t−3, . . . , t−N Therefore, the CNN has a total of (N−1)*2 input nodes. In addition, all the input nodes are converted into the two-dimensional form to extract plane features. It is learned based on a time delay of a train breaking system that the stop position of the train is not only related to running status information (the speed v and the position s) at a current time point of the breaking point, but also related to running statuses in a period of time before the breaking point. In the present disclosure, to adapt to a two-dimensional input of the CNN, not more than 18 pieces of running status information (2×18 pieces of data in total) are taken and converted into a 6×6 matrix form.

$$X_{in} = \begin{bmatrix} s_1 & v_1 & s_2 & v_2 & s_3 & v_3 \\ \vdots & \vdots & \vdots & \vdots & \vdots & \vdots \\ s_{15} & v_{16} & s_{17} & v_{17} & s_{18} & v_{18} \end{bmatrix}$$

In addition, when a structure of the CNN is established, sensitivity of the input data also needs to be considered, and the input layer needs to be standardized. In the present disclosure, Z-score standardization is used, where $x_i$ is defined as one of a column of eigenvalues $X_{col}$ in an input sample, $X_{col-z}$ is a column of eigenvalues after standardization, and input data $X_{in-z}$ is formed for each column after standardization. The input sample represents all $X_{in}$ obtained after two-dimensional conversion, namely, all input samples. Z-score standardization is used herein. Processed data conforms to a standard normal distribution, in other words, a mean value is 0 and a standard deviation is 1. A matrix is generated after each sample undergoes two-dimensional conversion, and corresponding elements of all matrices are in one column for standardization. $X_{in-z}$ is a new input sample generated by combining standardized elements in each column.

A specific standardization process is as follows:

$$\mu = \frac{1}{M} \sum_{i=1}^{M} x_i$$

$$\sigma^2 = \frac{1}{M} \sum_{i=1}^{M} (x_i - \mu)^2$$

$$X_{col-z} = \frac{x_i - \mu}{\sigma}$$

In the above formulas, μ represents a mean value corresponding to original data in each column, and σ represents a standard deviation corresponding to the original data in each column. After $$\frac{x_i - \mu}{\sigma},$$

elements in each column are processed. M represents a quantity of samples, and i represents one of the samples.

There is only one eigenvalue at the output layer of the model. Because there is only one output value, the neural network can directly correspond the input to the stop position without experiencing a reverse process of standardization. Therefore, a standardized input eigenvalue can directly correspond to an output label based on parameters of the neural network without experiencing the reverse process of standardization, to reduce complexity of the network.

Establish the convolutional layer of the CNN. At the convolutional layer, local information is maximally applied, and plane structure information is retained. In the present disclosure, one to two convolutional layers are set, and 10 to 30 convolution kernels are set for each layer. The convolutional layer is expressed as follows:

$$y_j^l = f\left(\sum_{i \in M_j} z_i^{l-1} \times k_{ij}^l + b_j^l\right)$$

In the above formula, l represents a quantity of convolutional layers, j represents a number of an output feature map, $y_j^l$ represents a $j^{th}$ feature map output by an $l^{th}$ convolutional layer, $k_{ij}^l$ represents a $j^{th}$ convolution kernel related to an $i^{th}$ feature map at the $l^{th}$ layer, $b_j^l$ represents a bias of the $j^{th}$ convolution kernel, and $f(\ )$ represents the activation function. In the present disclosure, one convolutional layer with 20 convolution kernels is used.

The activation function can change a result of linear accumulation of upper-layer neurons nonlinearly, to map different features. Common activation functions are sigmoid, tan h, ReLU, and the like. In the present disclosure, the ReLU function is selected as the activation function $f(\ )$. It can effectively improve the training speed and efficiency, and is specifically in the following form:

$$f(w^l z^{l-1}+b^l)=\max(0, w^l z^{l-1}+b^l)$$

In the above function, $w^l z^{l-1}+b^l$ represents an input vector of an upper-layer neural network.

Establish the hidden layer of the CNN. Information obtained after a convolution operation is expanded, and various features are further extracted. One expansion layer and two to three hidden layers are set. The hidden layer of the CNN is usually composed of two or more hidden layer neural networks. Each hidden layer includes a plurality of calculation nodes. It is assumed that there are a total of L hidden layers, there are $n_l$ neurons at an $l^{th}$ layer, $z^0 = X_{in\text{-}z}$ is used as an input of a $1^{st}$ hidden layer, and $z^l$ is used as an input of the $l^{th}$ layer. An output $y^l$ of the hidden layer is as follows:

$$y^l = f(w^l z^{l-1} + b^l)$$

In the above formula, $w^l \in R_{n_l \times n_{l-1}}$ represents a weight matrix from an $l-1^{th}$ layer to the $l^{th}$ layer, $b^l \in R_{n_l}$ represents a bias of the $l^{th}$ layer, and $f(\ )$ represents the activation function of the hidden layer. In the present disclosure, one expansion layer and two hidden layers are set after the convolutional layer. There are 10 neurons at each hidden layer.

Establish the output layer of the CNN. In the present disclosure, the control model for accurate stop of a high-speed train essentially predicts a future stop position of the train based on the current running status information and the running status information in the past period of time. Therefore, the output layer of the neural network is set as the stop position $s_p$ of the train. The actual stop position of the train is used as an output of the CNN, to monitor the running status information of the train in real time after the train enters a station. When the predicted stop position is 0, the breaking command is output to ensure stop accuracy.

Step 103: Train and optimize the CNN by using the training data set, to obtain an optimized CNN.

Step 103 specifically includes:

training and optimizing the CNN based on the training data set and by using an Adamax optimization algorithm and a Dropout method, to obtain the optimized CNN.

Dropout method: Overfitting means that data in the training set is well fitted, but effects of data in a validation set and a test set are not well expressed. There are many reasons for overfitting, such as massive parameters in the model and few training data. The present disclosure uses the Dropout method to prevent overfitting. A basic principle of the Dropout method is to randomly discard a certain proportion of neurons during model training, to reduce extraction of irrelevant feature data.

The output of the hidden layer may be changed as follows:

$$y^l = f(w^l z^{l-1} r^{l-1} + b^l)$$

In the above formula, $r^{l-1}$=Bernoulli(p), representing that a vector (0, 1) is randomly generated based on a probability of p.

The loss function is a response of the model to a degree of data fitting. A smaller loss function leads to a better fitting effect. The loss function is helpful to optimize the parameters of the neural network. In the present disclosure, a frequently used mean square error is used as the loss function in the training process to transfer the error. It is assumed that there is a group of historical stop samples, input data is $X=\{X_{in1}, X_{in2}, X_{in3} \ldots X_{inM}\}$ label data is $Y=\{s_{e1}, s_{e2}, s_{e3} \ldots s_{eM}\}$, and there are a total of M samples. The mean square error is specifically expressed as follows:

$$J(\omega, b) = \frac{1}{M} \sum_{0<m<M} \|s_{em} - s_{pm}\|^2$$

In the above formula, $s_{pm}$ represents an output value of an $m^{th}$ sample after the $m^{th}$ sample is processed by the CNN.

The optimization algorithm is to maximally approximate an optimal solution of a problem through iteration. Common optimization algorithms include Gradient Descent method, Newton's Method, Momentum, Nesterov Momentum, AdaGrad, Adam, and the like. All these optimization algorithms are essentially to establish an optimization model, and optimize the loss function (an optimized target function), to obtain a best model through training. The Adam optimization algorithm combines advantages of AdaGrad and RMSProp. The Adam optimization algorithm comprehensively considers first-order moment estimation (namely, a mean value of a gradient) and second-order moment estimation (namely, a non-centralized variance of the gradient) of the gradient, calculates an update step, and automatically adjusts a learning rate to resolve an adaptive problem of the learning rate. It is widely used in deep learning, but its learning rate is reduced at a later stage, affecting effective convergence. As a variant of Adam, Adamax is based on Adam with an infinity norm, and can overcome disadvantages of Adam to some extent. The present disclosure uses Adamax as the optimization algorithm, and sets the learning rate to 0.002.

A Tensorflow module of the Python programming language is used to build the CNN. The obtained data is preprocessed and then divided into the training set and the validation set to perform model training and validation on the CNN respectively. The best model is determined based on a change process of the loss function.

Figure 6:
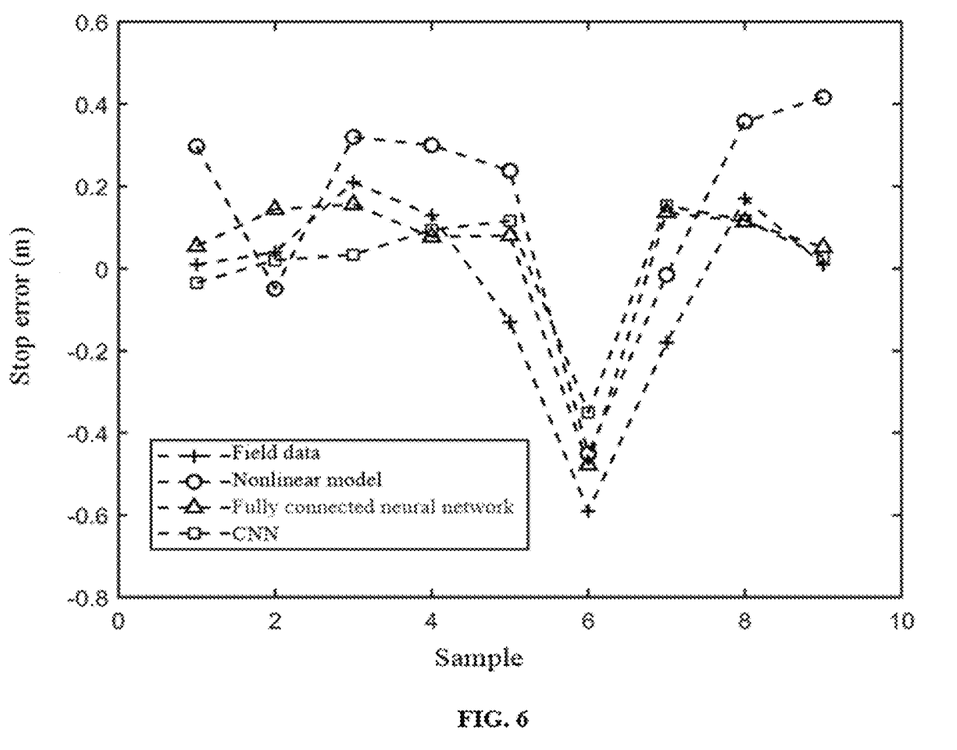
FIG. 6 compares stop positions predicted for 400H by using a CNN and other two stop methods.
Figure 7:
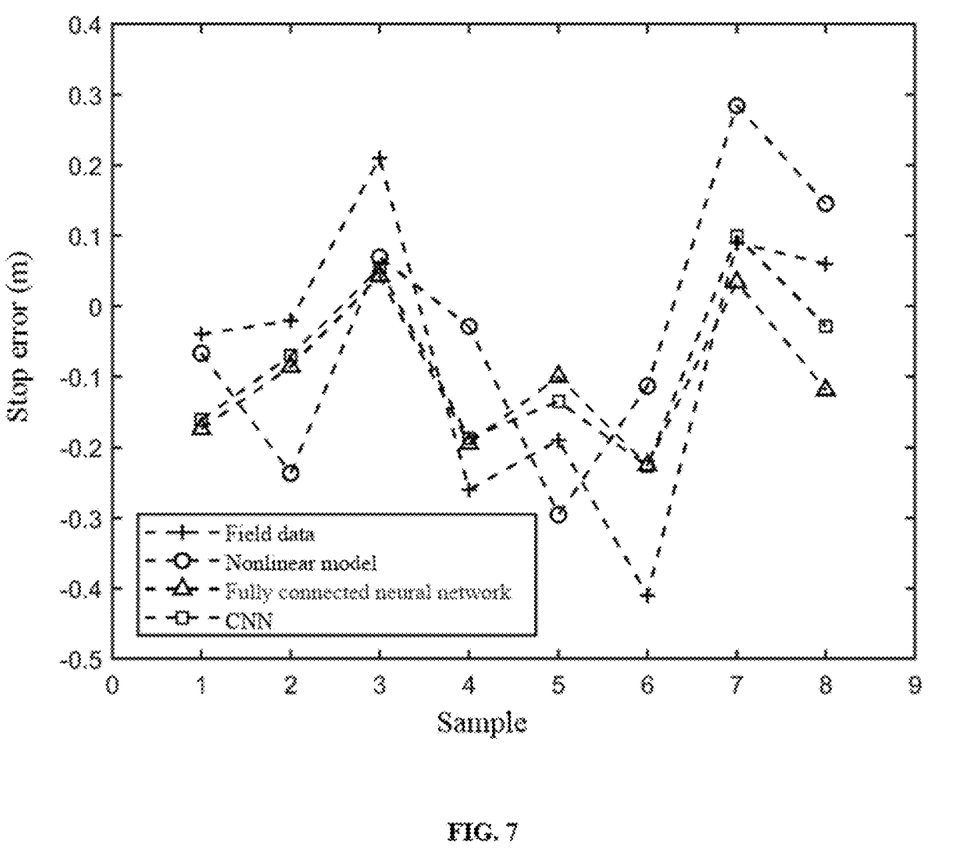
FIG. 7 compares stop positions predicted for 300S by using a CNN and other two stop methods.

Numerical value validation and comparison of the models:

Running data generated in a stop process of the train is selected, and stop positions of the train in different running statues are predicted in turn. To illustrate a prediction effect of the present disclosure, a nonlinear model and a deep neural network model are used for comparison, and evaluation indicators of training sets and test sets of the models are shown in Table 2 and Table 3. In addition, predicted outputs of samples in test sets of different vehicle types (400H and 300S) are provided. Stop positions predicted for different vehicle models by using the CNN and other two stop methods are compared, as shown in FIG. 6 and FIG. 7. FIG. 6 compares stop positions predicted for 400H by using the CNN and the other two stop methods. FIG. 7 compares stop positions predicted for 300S by using the CNN and the other two stop methods.

TABLE 2

Comparison of training sets of the three models

| Vehicle type | Model | MSE | MAE |
|---|---|---|---|
| 400H | NRM | 0.0448 | 0.1832 |
|  | DNN | 0.0107 | 0.0813 |
|  | CNN | 0.0025 | 0.0374 |
| 300S | NRM | 0.0449 | 0.1571 |
|  | DNN | 0.0198 | 0.1046 |
|  | CNN | 0.0036 | 0.0357 |

TABLE 3

Comparison of tests sets of the three models

| Vehicle type | Model | MSE | MAE |
|---|---|---|---|
| 400H | NRM | 0.0572 | 0.2138 |
|  | DNN | 0.0184 | 0.1102 |
|  | CNN | 0.0297 | 0.1296 |
| 300S | NRM | 0.0331 | 0.1621 |
|  | DNN | 0.0187 | 0.1105 |
|  | CNN | 0.0114 | 0.0919 |

It can be learned from the above that the CNN has achieved a good effect in model training, and its fitting efficiency has been improved by more than 34%. In terms of the test set, the CNN has good stop accuracy that is greatly improved compared with that of the nonlinear model. However, the accuracy of the CNN is not significantly improved compared with that of the deep neural network because the CNN has an excessively strong fitting capability and lacks experimental samples.

Step 104: Obtain actual running data of a to-be-controlled train, where the actual running data includes a corresponding position and speed of the to-be-controlled train at each time point in the specified time period.

Step 105: Input the actual running data into the optimized CNN to obtain a stop position of the to-be-controlled train.

Step 106: Determine whether the stop position of the to-be-controlled train is 0.

Step 107: If an output result of step 106 is that the stop position of the to-be-controlled train is 0, output the breaking command.

If the output result of step 106 is that the stop position of the to-be-controlled train is not 0, return to perform step 104.

Figure 8:
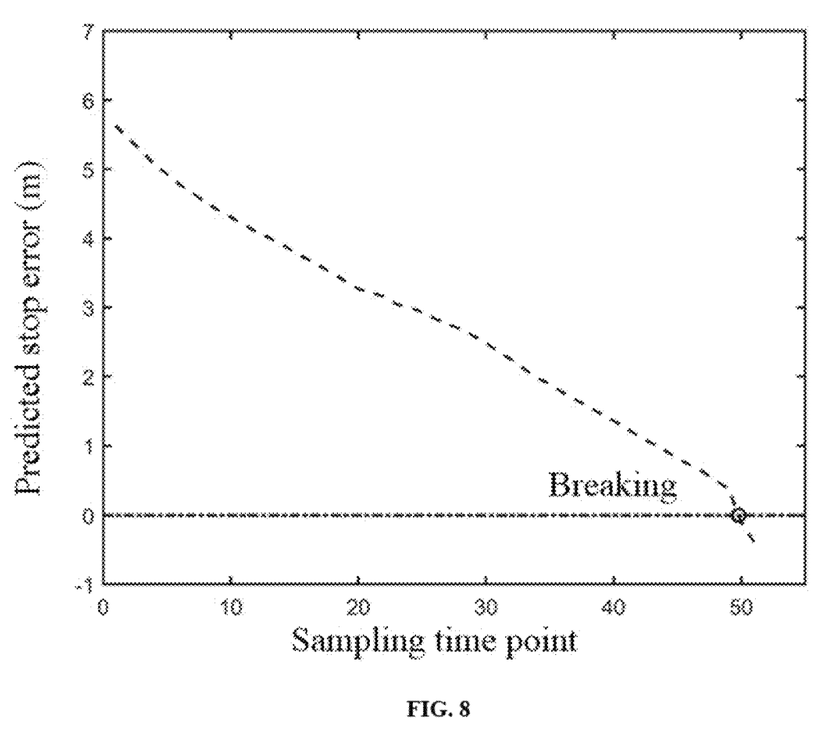
FIG. 8 is a diagram of outputting a breaking command based on a real-time predicted stop position of a train in a stop process of the train.

In an actual stop process in the station, a train driver observes the running status of the train and a position of the stop sign in real time at an inert stage before the last breaking, and outputs the breaking command at an optimal time point to ensure the stop accuracy. If the breaking command is output too early, the train will stop before reaching the stop sign, causing a positive stop error. If the breaking command is output too late, the train will stop in a position beyond the stop sign, causing a negative stop error. In this process, if the speed and the position of the train are detected in real time, there inevitably be a process in which the positive stop error changes to the negative stop error, in other words, there is a time point at which the stop error is 0. The time point is an optimal stop time point, and the last breaking operation is output. To further describe the control process of the present disclosure, the stop process of the train is simulated, and the time point of outputting the breaking command is shown in FIG. 8. FIG. 8 is a diagram of outputting the breaking command based on a real-time predicted stop position of the train in the stop process of the train.

Figure 9:
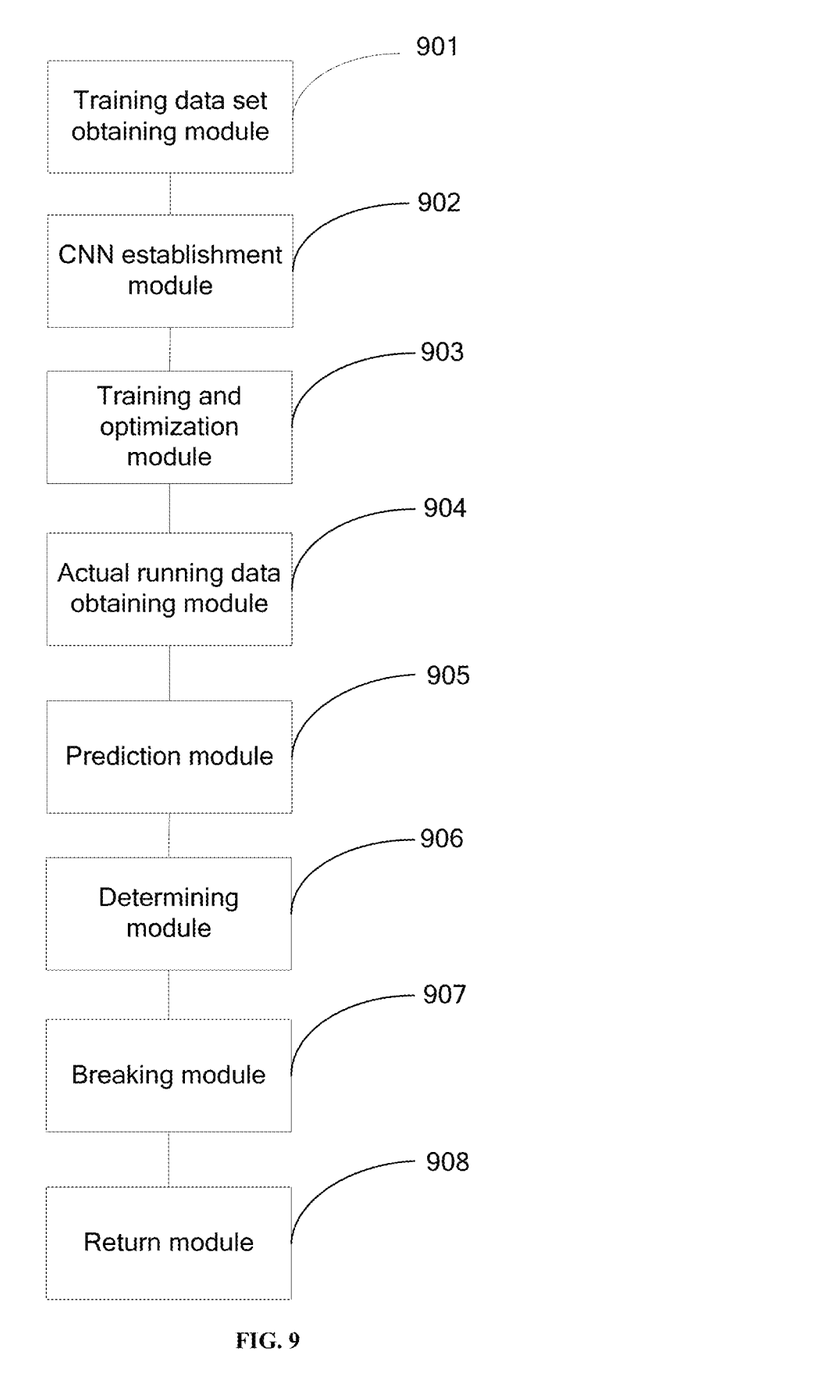
FIG. 9 is a structural diagram of an embodiment of a deep learning-based stop control system for a high-speed train according to the present disclosure.

FIG. 9 is a structural diagram of an embodiment of a deep learning-based stop control system for a high-speed train according to the present disclosure. As shown in FIG. 9, the deep learning-based stop control system for a high-speed train specifically includes a training data set obtaining module 901, a CNN establishment module 902, a training and optimization module 903, an actual running data obtaining module 904, a prediction module 905, a determining module 906, a breaking module 907, and a return module 908.

The training data set obtaining module 901 is configured to obtain a training data set, where the training data set includes a corresponding position, speed, and stop position of a train at each time point in a specified time period, and the specified time period includes a current time point and a time point before the current time point.

The CNN establishment module 902 is configured to establish a CNN.

The CNN specifically includes an input layer, A convolutional layers, an expansion layer, B hidden layers, and an output layer, where A is a positive integer greater than 0 and less than or equal to 2, and B is a positive integer greater than or equal to 2 and less than or equal to 3.

The input layer includes (N−1)*2 two-dimensional input neurons, where N represents a quantity of time points included in the specified time period.

Each convolutional layer includes C convolution kernels, where C is a positive integer greater than or equal to 10 and less than or equal to 30.

Each hidden layer includes D neurons, where D is a positive integer greater than or equal to 5 and less than or equal to 20.

The training and optimization module 903 is configured to train and optimize the CNN by using the training data set, to obtain an optimized CNN.

The training and optimization module 903 specifically includes:

a training and optimization unit, configured to train and optimize the CNN based on the training data set and by using an Adamax optimization algorithm and a Dropout method, to obtain the optimized CNN.

The actual running data obtaining module 904 is configured to obtain actual running data of a to-be-controlled train, where the actual running data includes a corresponding position and speed of the to-be-controlled train at each time point in the specified time period.

The prediction module 905 is configured to input the actual running data into the optimized CNN to obtain a stop position of the to-be-controlled train.

The determining module 906 is configured to determine whether the stop position of the to-be-controlled train is 0.

The breaking module 907 is configured to output a breaking command when an output result of the determining module 906 is that the stop position of the to-be-controlled train is 0.

The return module 908 is configured to return to execute the actual running data obtaining module 904 when the output result of the determining module 906 is that the stop position of the to-be-controlled train is not 0.

The deep learning-based stop control system for a high-speed train further includes:

a standardization module, configured to standardize the position and the speed of the train.

The present disclosure provides real-time optimization-based intelligent stop method and system for a high-speed train, and relates to a parameter identification method for a stop control model for a high-speed train, to perform accurate modeling on a stop process of a train based on real-time data generated in the stop process of the train, and predict a stop position of the train online to ensure stop accuracy.

The present disclosure provides a data driving-based dynamic running status prediction model for a train. The model dynamically predicts a stop position in a station based on real-time data generated in a running process of a train and running status information (a speed, a position, and the like) of the train by using a deep learning method, to perform accurate stop control on the high-speed train. The present disclosure has the following advantages:

(1) Compared with a traditional stop control model for a train, the present disclosure dynamically perceives impact of an external environment change on the train based on speed and position information generated in the actual running process of the train, and can reflect the real running status of the train, to accurately predict the stop position of the train.

(2) The present disclosure overcomes shortcomings such as fixed parameters and low accuracy in the traditional PID control model, improves an online learning capability, has strong adaptability, improves comfortableness of passengers, and avoids frequent operations.

(3) The present disclosure can directly use historical data generated in the running process of the train to train the model and adjust the parameters, thereby omitting massive field tests and parameter adjustments, and reducing costs.

Each embodiment of this specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, several specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

What is claimed is:

1. A deep learning-based stop control method for a high-speed train, the method comprising:

obtaining a training data set, wherein the training data set comprises a corresponding position, speed, and stop position of a train at each time point in a time period, and the time period comprises a current time point and a time point before the current time point;

establishing a convolutional neural network (CNN), wherein the CNN comprises an input layer, A convolutional layers, an expansion layer, B hidden layers, and an output layer, wherein A is a positive integer greater than 0 and less than or equal to 2, and B is a positive integer greater than or equal to 2 and less than or equal to 3, the input layer comprises (N−1)*2 two-dimensional input neurons, wherein N represents a quantity of time points comprised in the time period, each convolutional layer comprises C convolution kernels, wherein C is a positive integer greater than or equal to 10 and less than or equal to 30, and each hidden layer comprises D neurons, wherein D is a positive integer greater than or equal to 5 and less than or equal to 20:

training and optimizing the CNN by using the training data set and a Dropout method, to obtain an optimized CNN, wherein the Dropout method comprises:

step 1: randomly discarding a proportion of neurons during model training; and step 2: changing an output $y^l$ of the hidden layer from $y^l=f(w^l z^{l-1}+b^l)$ to $y^l=f(w^l z^{l-1} r^{l-1}+b^l)$ where $w^l$ represents a weight matrix from an $l-1^{th}$ hidden layer to an $l^{th}$ hidden layer, $b^l$ represents a bias of the $l^{th}$ hidden layer, $z^{l-1}$ represents the input of the $(l-1)^{th}$ hidden layer, $r^{l-1}$=Bernoulli(p) representing that a vector (0, 1) is randomly generated based on a probability of p;

obtaining actual running data of a to-be-controlled train, wherein the actual running data comprises a corresponding position and speed of the to-be-controlled train at each time point in the time period;

inputting the actual running data into the optimized CNN to obtain a stop position of the to-be-controlled train;

determining whether the stop position of the to-be-controlled train is 0; and if the stop position of the to-be-controlled train is 0, outputting a breaking command; or if the stop position of the to-be-controlled train is not 0, performing the step of "obtaining actual running data of a to-be-controlled train".

2. The deep learning-based stop control method according to claim 1, wherein after the obtaining the training data set, the method further comprises:

standardizing the position and the speed of the train.

3. A deep learning-based stop control system for a high-speed train, the system comprising:

a training data set obtaining module, configured to obtain a training data set, wherein the training data set comprises a corresponding position, speed, and stop position of a train at each time point in a time period, and the time period comprises a current time point and a time point before the current time point;

a convolutional neural network (CNN) establishment module, configured to establish a CNN, wherein the CNN comprises an input layer, A convolutional layers, an expansion layer, B hidden layers, and an output layer, wherein A is a positive integer greater than 0 and less than or equal to 2, and B is a positive integer greater than or equal to 2 and less than or equal to 3, the input layer comprises (N−1)*2 two-dimensional input neurons, wherein N represents a quantity of time points comprised in the time period, each convolutional layer comprises C convolution kernels, wherein C is a positive integer greater than or equal to 10 and less than or equal to 30, and each hidden layer comprises D neurons, wherein D is a positive integer greater than or equal to 5 and less than or equal to 20:

a training and optimization module, configured to train and optimize the CNN by using the training data set and a Dropout method, to obtain an optimized CNN, wherein the Dropout method comprises:

step 1: randomly discarding a proportion of neurons during model training; and step 2: changing an output $y^l$ of the hidden layer from $y^l=f(w^l z^{l-1}+b^l)$ to $y^l=f(w^l z^{l-1} r^{l-1}+b^l)$ where $w^l$ represents a weight matrix from an $l-1^{th}$ hidden layer to an $l^{th}$ hidden layer, $b^l$ represents a bias of the $l^{th}$ hidden layer, $z^{l-1}$ represents the input of the (l−1)th hidden layer, $r^{l-1}$=Bernoulli(p), representing that a vector (0, 1) is randomly generated based on a probability of p;

an actual running data obtaining module, configured to obtain actual running data of a to-be-controlled train, wherein the actual running data comprises a corresponding position and speed of the to-be-controlled train at each time point in the time period;

a prediction module, configured to input the actual running data into the optimized CNN to obtain a stop position of the to-be-controlled train;

a determining module, configured to determine whether the stop position of the to-be-controlled train is 0;

a breaking module, configured to output a breaking command when an output result of the determining module is that the stop position of the to-be-controlled train is 0; and a return module, configured to return to execute the actual running data obtaining module when the output result of the determining module is that the stop position of the to-be-controlled train is not 0.

4. The deep learning-based stop control system according to claim 3, wherein the system further comprises:

a standardization module, configured to standardize the position and the speed of the train.

* * * * *